Patented July 31, 1951

2,562,410

UNITED STATES PATENT OFFICE 2,562,410

OXY-PENICILLINS

Otto K. Behrens, Reuben G. Jones, and Quentin F. Soper, Indianapolis, Ind., and Joseph W. Corse, Lafayette, Calif., assignors to Eli Lilly and Company, Indianapolis, Ind., a corporation of Indiana No Drawing. Application May 3, 1949,
Serial No. 91,215

7 Claims. (Cl. 260—239.1)

This invention relates to antibiotic compounds and is directed to novel oxy-penicillins. This application is a continuation-in-part of our copending prior applications Serial Nos. 653,136 and 653,137, filed March 8, 1946, now Patents Nos. 2,479,295 and 2,479,296 respectively, and Serial Nos. 773,448 and 773,449, filed September 11, 1947, now abandoned.

There are certain known penicillins comprising a group of chemically related compounds which, under suitable conditions of growth, are produced as metabolic products by a penicillin-producing mold. The complete molecular structures of these compounds had not been definitely established when said prior applications were filed but sufficient elucidation of structure had been accomplished to allow the assignment to them of the following empirical formula

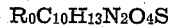

wherein $R_0$ represents an organic radical which is characteristic of each individual penicillin.

These known penicillins comprise a group of penicillins of the foregoing formula including those wherein the $R_0$ radical represents a butene-1-yl, n-butyl, n-hexyl, phenyl or a p-hydroxyphenyl radical. It is known, furthermore, that in the normal fermentative production these known penicillins are formed in admixture.

The known penicillins thus identified, in view of further elucidiation of the $C_{10}H_{13}N_2O_4S$ portion thereof, may be represented by the following formula

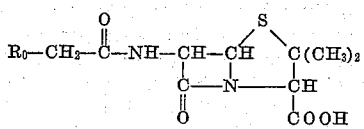

in which $R_0$ has the same meaning as set forth above.

We have made the surprising discovery that a penicillin-producing mold may be induced to produce a novel penicillin, by incorporating in the nutrient medium wherein the mold is grown, a selected organic compound, called herein a precursor compound. Such selected precursor compound, although foreign to the normal metabolic requirements of the mold, may be metabolized and incorporated in substantial part in the molecule of a novel penicillin. This result is especially surprising in view of the recognized specificity of the enzyme systems whereby lower organisms maintain growth and development. It is further surprising that use of a selected precursor compound may lead to the production of a novel penicillin to the substantial exclusion of the known and normally-produced penicillins.

The present invention contemplates novel products of fermentative processes which comprise growing a penicillin-producing mold in association with a culture medium containing nutrient material and a selected precursor compound, said product consisting essentially of a penicillin represented by the formula

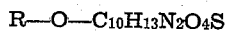

in which R is a radical of the class consisting of aliphatic radicals containing from 2 to 6 carbon atoms and phenyl radicals which are not more than monosubstituted. Aliphatic radicals which R represents include the alkyl radicals from ethyl through hexyl, alkylene radicals, for example allyl, 2-methylallyl, butene-2-yl, etc., and substituted alkyl and alkylene radicals, for example, 2-chloroethyl, 2-bromoallyl, 3-chloroallyl, etc. Phenyl radicals which R represents include the phenyl radical itself and monosubstituted phenyl radicals, for example, the halophenyl radicals, tolyl, methoxyphenyl, hydroxyphenyl, and nitrophenyl. Preferably the monosubstituent on substituted phenyl radicals is at the para or meta position.

The novel penicillins are ordinarily produced in the form of a salt, for example the sodium salt of the pinicillin acid. The salt may be either the salt originally produced or a different salt to which the original product is transformed, and preferably is one of the salts ordinarily employed in the administration of the known penicillins, such as the common metal salts, for example, the sodium salt, the potassium salt, the ammonium salt, the calcium salt, etc.

According to the present knowledge of the structure of penicillin, the products of this application, as defined above, including both acids and salts thereof, may be represented by the following structural formula

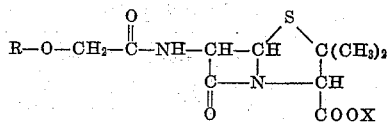

in which R has the same meaning as before, and in which X represents hydrogen when the penicillin is in acid form and represents a salt-forming radical when the penicillin is in a salt form, such salt-forming radical including those ordinarily employed in penicillin production and therapy, such as potassium, sodium, ammonium, etc.

For convenience we use below the empirical formula, e. g., $C_{10}H_{13}N_2O_4S$, as representing the molecular portion of the penicillin to which the R—O— radical is attached.

The new penicillins may be named by reference to the particular R—O— radical contained therein. Thus, for example, a penicillin wherein the R—O— radical is the n-hexyloxy radical, is named n-hexyloxy-penicillin; and a penicillin wherein the R—O— radical is the m-chlorophenoxy radical, is called m-chlorophenoxy-penicillin.

Broadly speaking, a method of producing a novel penicillin in accordance with this invention is as follows: There is provided a nutrient medium suitable for the growth of a penicillin-producing mold. To the nutrient medium is added in effective amount a precursor compound comprising an R—O— monosubstituted acetic acid or its equivalent. Precursor compounds useful for this purpose comprise monosubstituted acetic acids represented by the formula $$R-O-CH_2-COOH$$

wherein R has the same meaning as before. In place of the monosubstituted acetic acids, there may be used equivalents of such acetic acids, said equivalents comprising those compounds readily converted by the mold to the monosubstituted acetic acids. Such equivalents include simple derivatives of the acids such as their salts, esters, amides, and anhydrides, and may include other compounds, which the mold may convert to the monosubstituted acetic acids, such as ω—R-substituted, saturated straight-chain alcohols, amines, aldehydes, and acids containing an even number of carbon atoms, and the simple derivatives thereof.

The culture medium composition comprising nutrient material and precursor compound is inoculated with a penicillin-producing mold and the mold is grown under penicillin-producing conditions, during which growth a new penicillin is produced by the mold as a metabolic product. After mold growth, the mold mycelium is separated from the culture medium, and from the latter the novel penicillin is separated.

The isolation of the new penicillin may be effected by methods known to the art, such as adsorption and extraction, to obtain a product sufficiently pure for practical purposes. If a purer product is desired, the new penicillin may be subjected to additional methods of purification such as partition chromatography and elution, and recrystallization.

The novel penicillin desirably is recovered in the form of one of its salts, for example the sodium or potassium salt. Identification of the novel penicillin may be confirmed by methods known to the art, such methods comprising analysis, spectroscopic absorption, X-ray diffraction and antibacterial tests.

The nutrient material used in the composition wherein the mold is grown may comprise ingredients such as water, sugars, inorganic salts and desirably one or more indeterminate compositions such as corn steep amino acids and bran. Numerous suitable nutrient media comprising materials of the type mentioned are known to the art.

During the growth of the mold the culture medium comprising nutrient material and precursor compound is maintained at a suitable temperature, for example, in the range of 20–30° C. The range of temperature which has been found to be particularly suitable is from 24–26° C. The period of time during which the mold is grown will depend upon the objective desired. Thus the mold may be grown only during the period of its maximum rate of growth before mold growth is interrupted preliminary to isolating the new penicillin. Such a period generally is from 2 to 3 days. On the other hand, the mold may be grown for a longer period of time to obtain the maximum yield of new penicillin. In such a case, mold growth is usually continued for about 4 to 5 days.

The mold may be grown under various conditions. For example, the mold may be grown without agitation of the culture medium, in which case the mold grows on the surface of the medium. Alternatively, the culture medium may be agitated by shaking or stirring during the growth of the mold in which case the mold is dispersed throughout the culture medium and grows while so dispersed.

The molds suitable for the purposes of this invention are mold organisms of the type capable of producing penicillins. Such organisms include molds of the *Penicillium notatum-chrysogenum* group as well as certain molds of the *Aspergillus* group. It is to be understood that not all mold strains are equally efficient for the purpose of this invention. By way of example, mold strains suitable for the purposes of this invention are those known as strains X1612 and Q176 of the *Penicillium notatum chrysogenum* group and strain G147 of the *Aspergillus flavus* group.

The concentration of the precursor compounds employed in the culture medium may vary over a substantial range. The precursor compounds may be present in the culture medium in concentrations of the order of about 1 percent, but it is usually desirable that smaller concentrations be employed since there is no particular advantage to be gained in employing concentrations in substantial excess of those necessary to produce the optimum effect. It appears at present that the optimum concentration of the monosubstituted acetic acids and derivatives thereof lies in the range of about 0.01 to about 0.05 percent on a weight-volume basis when mold strain X1612 is used, and that this optimum concentration may range upwardly when mold strain Q176 is used.

The precursor compound may be associated with the mold and culture medium at any suitable time. Thus the materials of the nutrient medium may be inoculated with the mold and the precursor compound to be employed may be incorporated either before or after inoculation of the culture medium with the mold.

The following specific examples further illustrate the invention.

*Example 1*

The sodium salt of phenoxy-penicillin represented by the formula

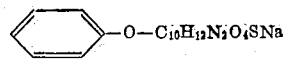

can be prepared in the following manner:

A culture medium is prepared in the following proportions:

| | | |
|---|---|---|
| Lactose | g | 125 |
| Corn steep solids | g | 150 |
| Calcium carbonate | g | 25 |
| N-(2-hydroxyethyl)-phenoxyacetamide | g | 0.78 |
| Water | cc | 5000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with an equal volume of amyl acetate. The amyl acetate layer is separated and extracted with three successive 100 cc. portions of cold water to which cold N/10 sodium bicarbonate solution is added during the course of each extraction until a pH of about 7.0 to 7.3 is attained in the aqueous phase. The aqueous extracts are combined, cooled to about 0° C., acidified to about pH 2.2 with orthophosphoric acid and extracted successively with three 100 cc. portions of ether. The ether extracts are combined, and are passed through a chromatographic type silica adsorption column about 30 mm. in diameter and 250 mm. long and containing a pH 6.2 phosphate buffer. The silica column is developed by percolation with six 100 cc. portions of ether containing successively increasing amounts of methanol in the order of ½, 1, 1½, 2, 2½ and 3 percent.

The developed silica column is divided into about 12 equal sections and each section is eluted with three 30 cc. portions of M/15 phosphate buffer of pH 7.0. The eluates are assayed bacteriologically to determine their penicillin content. Most of the antibiotic activity is found in certain of the sections, and the eluates from these sections are combined, cooled to about 0° C. and acidified to about pH 2.2 and extracted with three 50 cc. portions of chloroform. The combined chloroform extracts are passed through a silica adsorption column containing a pH 6.2 phosphate buffer. This silica column is developed by percolation with three 150 cc. portions of chloroform containing successively increasing amounts of methanol in the order of 1, 2, and 3 percent. The developed silica column is then divided into 12 equal sections and each section is eluted with three 30 cc. portions of M/15 phosphate buffer of pH 7.0. Again most of the antibiotic activity originates in certain of the sections of the column, and the eluates from these sections are combined, cooled to about 0° C., acidified to about pH 2.2 and extracted with three 100 cc. portions of ether. The ether extracts are combined and extracted with about 75 cc. of a cold, dilute aqueous solution of sodium hydroxide to which N/10 sodium hydroxide is added during the course of the extraction so that a final pH of about 7.0 is attained in the aqueous phase. From the aqueous solution, the sodium salt of phenoxy-penicillin may be prepared by any suitable means, for example by freezing and evaporation in vacuo from the frozen state.

The sodium salt thus obtained is purified by dissolving it in 2 cc. of absolute acetone from which upon standing it separates in crystalline form. It is separated by centrifugation and washed with small portions of absolute acetone. It is then dissolved in about 3 cc. of 85 percent aqueous acetone, the solution filtered and 4 cc. of absolute acetone added to the filtrate whereupon the pure crystalline material separates. The salt is recrystallized by dissolving it in about 3 cc. of 85 percent aqueous acetone followed by the addition of about 7 cc. of absolute acetone.

The sodium salt of phenoxy-penicillin assayed about 1660 Oxford units per milligram when tested against *Staph. aureus*, strain 209P. A differential assay when carried out on *Staph. aureus*, strain 209P, and *B. subtilis*, strain N. R. R. L. B–558, gave a value of about 0.87. Analysis showed the presence of 51.17 percent carbon, 4.49 percent hydrogen, 7.59 percent nitrogen and 8.50 percent sulfur as compared with the calculated values of 51.34 percent carbon, 4.60 percent hydrogen, 7.55 percent nitrogen and 8.61 percent sulfur.

*Example 2*

The sodium salt of phenoxy-penicillin can also be prepared as follows:

A culture medium is prepared as in Example 1 and is placed in a 5 gallon bottle equipped with a stirrer and an air inlet tube fitted with an air filter, etc.

The culture medium is sterilized and inoculated with a spore suspension of Penicillium mold, strain X1612. The bottle contents are maintained at a temperature of about 23–26° C. and are continuously stirred for five days. Throughout this time, air is continuously passed through the air inlet tube. The mold mycelium is then removed from the aqueous broth by filtration, and the filtrate is treated as in Example 1 to isolate and purify the phenoxy-penicillin. The sodium salt of phenoxy-penicillin thus prepared is the same as that prepared by the procedure of Example 1.

*Example 3*

The sodium salt of p-methoxyphenoxy-penicillin represented by the formula

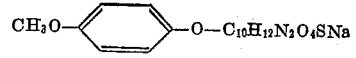

is prepared by the procedure of Example 1 using N-(2-hydroxyethyl)-p-methoxyphenoxy acetamide as the precursor in the proportion of 180 mg. per liter of culture medium. In a preparation thus carried out, the ether-buffer (pH 6.4) chromatographic column was found to contain a band of antibiotic activity at the upper portion of the column. When the material recovered from this band was passed through the chloroform-buffer chromatographic column, the activity was found divided into two portions, one on a column, and one in the development solvent. This latter was recovered and crystallized from acetone by the procedure set forth in Example 1. The crystalline material was recrystallized five times from 90 percent acetone by the addition of absolute acetone, and the p-methoxyphenoxy-penicillin so obtained assayed 1120 units per mg. and gave a differential assay value of 0.92. Analysis showed the presence of 6.35 percent nitrogen and 7.14 percent methoxyl as compared with calculated values of 6.96 percent nitrogen and 7.71 percent methoxyl.

*Example 4*

Other oxy-penicillins of our invention are prepared by the procedures of the foregoing examples, using precursors containing the oxy radical desired in the penicillin. Thus, the following other new oxy-penicillins are prepared using the precursors listed.

| New Penicillins | Precursors for the New Penicillins |
|---|---|
| p-tolyloxy-penicillin | N-(2-hydroxyethyl)-p-tolyloxyacetamide |
| m-tolyloxy-penicillin | N-(2-hydroxyethyl)-m-tolyloxyacetamide |
| p-bromophenoxy-penicillin | N-(2-hydroxyethyl)-p-bromophenoxyacetamide |
| m-chlorophenoxy-penicillin | N-(m-chlorophenoxyacetyl)-dl-valine |
| p-nitrophenoxy-penicillin | N-(2-hydroxyethyl)-p-nitrophenoxyacetamide |
| ethoxy-penicillin | ethoxyacetic acid |
| allyloxy-penicillin | allyloxyacetic acid |
| n-butoxy-penicillin | n-butoxyacetic acid |
| isoamyloxy-penicillin | isoamyloxyacetic acid |

*Example 5*

The new penicillins obtained in the form of their sodium salts may be converted to other salts in a number of ways. One way is as follows: An aqueous solution of the sodium salt, acidified to about pH 2, is extracted with an equal volume of an organic solvent, such as amyl acetate, ether, chloroform, or the like. The organic solvent solution, containing the new penicillin in acid form, is extracted with an aqueous solution containing the cation of the desired salt, for example, a solution of potassium hydroxide, calcium phosphate, ammonium hydroxide, or the like, at about pH 8.5. The aqueous extract contains the penicillin as the corresponding salt, for example, the potassium salt, the calcium salt, or the ammonium salt of the penicillin, and such salt is suitably recovered from the solution, as by drying in vacuo from the frozen state.

We claim as our invention:

1. A compound of the group consisting of a new penicillin acid and its sodium, potassium, calcium and ammonium salts, said acid being represented by the formula

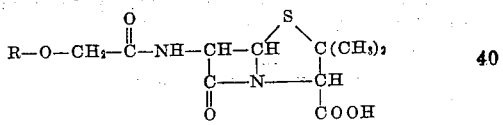

in which R is a radical of the class consisting of aliphatic hydrocarbon radicals having from 2 to 6 carbon atoms, the phenyl radical, and monosubstituted phenyl radicals in which the substituent is a member of the group consisting of lower aliphatic hydrocarbon, lower aliphatic hydrocarbon ether, nitro, and halogen substituents.

2. A new penicillin represented by the formula

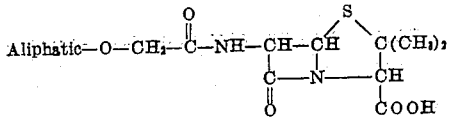

in which "aliphatic" is an aliphatic hydrocarbon radical having from 2 to 6 carbon atoms.

3. A new penicillin represented by the formula

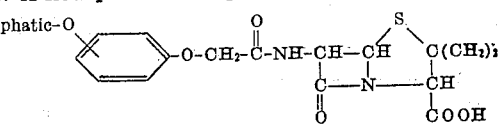

in which "aliphatic" is a lower aliphatic hydrocarbon radical.

4. Phenoxy-penicillin.
5. p-Methoxyphenoxy-penicillin.
6. Isoamyloxy-penicillin.
7. p-Nitrophenoxy-penicillin.

OTTO K. BEHRENS.
REUBEN G. JONES.
QUENTIN F. SOPER.
JOSEPH W. CORSE.

REFERENCES CITED

The following references are of record in the file of this patent:

UNITED STATES PATENTS

| Number | Name | Date |
|---|---|---|
| 2,479,295 | Behrens et al. | Aug. 16, 1949 |